United States Patent [19]

Nelson

[11] Patent Number: 4,943,134

[45] Date of Patent: Jul. 24, 1990

[54] COUPLER

[75] Inventor: Brian P. Nelson, Woodbridge, England

[73] Assignee: British Telecommunications, Public Limited Company, London, England

[21] Appl. No.: 278,439

[22] PCT Filed: Mar. 2, 1988

[86] PCT No.: PCT/GB88/00154

§ 371 Date: Nov. 22, 1988

§ 102(e) Date: Nov. 22, 1988

[87] PCT Pub. No.: WO88/06747

PCT Pub. Date: Sep. 7, 1988

[30] Foreign Application Priority Data

Mar. 6, 1987 [GB] United Kingdom ................ 8705272

[51] Int. Cl.$^5$ ............................................. G02B 6/26
[52] U.S. Cl. ................................ 350/96.13; 350/46.33
[58] Field of Search ............... 350/96.15, 96.29, 96.20, 350/96.33

[56] References Cited

U.S. PATENT DOCUMENTS 4,557,551 12/1985 Dyott ............................... 350/96.15
4,589,728 5/1986 Dyott et al. .................. 350/96.15 X
4,668,264 5/1987 Dyott ............................. 350/96.15 X

OTHER PUBLICATIONS

Kitayama & Wang, Appl. Phys. Lett. 43, 17–19 (1983).
Jensen, IEEE, Trans. on Microw. Th. & Tech., vol. MTT-30, No. 10, Oct. 1982 pp. 1568–1571.
Wabnitz et al, ECOC (1986).
Cozens and Bouclouvalas, Elec. Lett. 18, 138–140 (1982).
Bouclouvalas and Georgiou, Optics Letters 11, No. 4.
Dalno, et al, "Stability Analysis of Nonlinear Coherent Coupling", J. Appl. Phys., vol. 58, (12), Dec. 15, 1985 pp. 4512–4514.
Jensen, IEEE Journal of Quantum Elec. vol. QE-18, No. 10 Oct. 1982, pp. 1580–1583.
Love et al, Optics Communications, 59(1983) Sep. No. 3 Amsterdam "Beam Propagation ... Directional Coupler", pp. 177–182.
Sarid et al, Journal of the Optical Society of Amer., vol. 72, No. 2, "Tunable Nonlinear Directional Coupler", pp. 835–838.
Busurin, Soviet Journal of Quantum Elec., vol. 12, No. 2, Feb. '84, "Investigation of an Optical Converter ... Waveguides", pp. 249–251.

Primary Examiner—William L. Sikes
Assistant Examiner—Phan T. Heartney
Attorney, Agent, or Firm—Nixon & Vanderhye

[57] ABSTRACT

An optical coupler comprises at least two waveguides (4,5) arranged so that light couples from one to the other. The waveguides are dissimilar and support different mode fields, and the composition or geometry of the waveguides is varied to determine the particular critical phenomenon characteristic that is required.

15 Claims, 1 Drawing Sheet

COUPLER

FIELD OF THE INVENTION

This invention relates to couplers and especially to optical couplers.

BACKGROUND AND SUMMARY OF THE INVENTION

Coupling light from one optical fibre to another can be achieved by placing two parallel fibres in close proximity so that the mode fields of the fibres overlap. This is the principle of the known parallel fibre coupler in which the two fibres are identical and light periodically couples out of the launch fibre and into the other fibre. If the material of the fibre is non-linear in that its refractive index varies with light intensity, then the coupling characteristic is altered. A non-linear parallel fibre coupler has been proposed, consisting of two identical fibres of non-linear material, the predicted coupling characteristics of which are similar to those of the linear coupler up to a critical power, above which the degree of coupling is much reduced. At the critical power a steady, equal power distribution is obtained. This critical power phenomenon enables the coupler to exhibit two distinct output states for small changes in input power so that the device may be used, for example, as an optical switch or amplifier.

Non-linear parallel fibre couplers made from currently available materials would require comparatively long interaction lengths in order that the critical power can be reached. Hence, the elements would need to be of the order of 1 cm and it presents a significant technological problem to fabricate accurately parallel fibre guides for that length. Also at the critical power the power division is even which is not optimal for all purposes.

Accordingly the present invention provides an optical coupler comprising at least two waveguides positioned in coupling proximity, wherein the waveguides comprise nonlinear refractive index material and support non-identical mode fields and wherein the waveguides are such that the value of the overlap integral of the nonlinear reaction of each waveguide with itself is in a predetermined ratio to that overlap integral of the other waveguide to provide predetermined critical power characteristics of the coupler.

Another aspect of the invention provides an optical coupler comprising at least two waveguides positioned in coupling proximity, wherein the waveguides comprise nonlinear refractive index material and support non-identical mode fields and wherein the waveguides are such that the values of the overlap integrals of the nonlinear reaction of each waveguide with itself have a maximum normalised difference value of +0.12.

Preferably, to keep the required power levels within reasonable limits the minimum value should be of the order of −0.5. Values in the range between −0.12 and +0.12 are considered desirable.

Within the context of this specification nonlinear refractive index refers to the non-linearity that occurs due to the Kerr effect in which the refractive index varies with field strength.

In a preferred embodiment the waveguides are coaxially disposed.

Power may be launched into either waveguide with some embodiments, or alternatively the asymmetric nature of the critical phenomenon in embodiments with a difference in said overlap integrals may be exploited by launching power into a particular one of the waveguides.

BRIEF DESCRIPTION OF THE DRAWINGS

The invention is now described by way of example with reference to the accompanying drawings in which.

DETAILED DESCRIPTION OF A PRESENTLY PREFERRED EXEMPLARY EMBODIMENT

Figure 1:
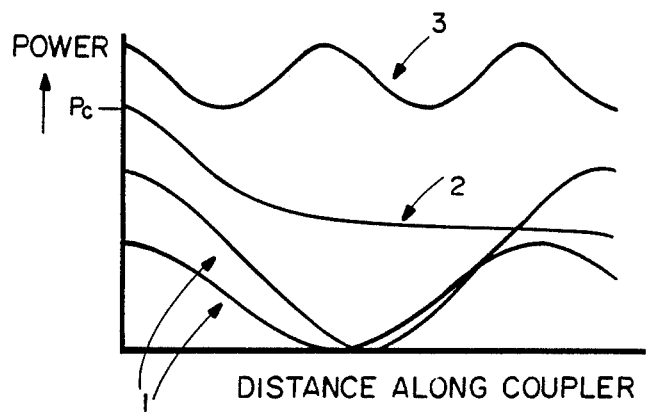
FIG. 1 illustrates coupling characteristics for nonlinear coupling such as, for example, parallel fibre couplers.
Figure 2:
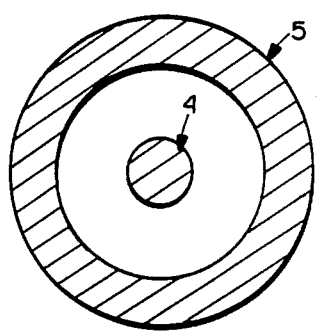
FIG. 2 illustrates a preferred embodiment of the invention.

Referring to FIG. 1, reference numerals 1, 2 and 3 show respectively the characteristics for a nonlinear parallel coupler below, at and above a critical power level $P_c$. For small Kerr coefficient materials fabrication of sensitive devices using the critical power phenomenon requires couplers of the order of 1 cm in length and this creates a fabrication problem. Thus the preferred structure for the invention is a coaxial arrangement as shown in FIG. 2 in which a central rod 4 constitutes a first waveguide and is surrounded by a second tubular waveguide 5. Structures of this type can be accurately made for great lengths (over 1 Km) by optical fibre technology. Alternative structures are possible, in particular the rod could be replaced by an inner tubular guide while maintaining a circularly symmetric cross section and the accompanying fabrication advantages. Coaxial rod and tube couplers fabricated for use as linear couplers are known, and these function similarly to linear parallel fibre couplers in that periodically there is total coupling of light from one guide into the other, but unlike the linear parallel fibre couplers a linear coaxial coupler only couples at a single wavelength at which the rod and tube modes are in phase: in the parallel fibre coupler the fibres are identical and phase matching occurs and hence coupling is to a first approximation wavelength-independent.

The inventor has found however, and a mathematical explanation is given hereinafter, that the behaviour of a coaxial coupler made from nonlinear material does not show the same critical power characteristics as the known nonlinear parallel fibre coupler. It is found that when power is launched into the rod a critical power does not generally occur and when power is launched into the tube a critical power is observed but the distribution between the guides at the critical power is generally asymmetric whereas in the parallel fibre coupler it is evenly distributed. A fuller investigation of the critical power phenomenon for dissimilar coupled waveguides reveals that for a critical power at which the distribution is even the value of the overlap integral of the nonlinear waveguide with itself must equal the value of that overlap integral for the other waveguide.

A nonlinear waveguide has a refractive index profile modified by the Kerr effect so that $$n = n_o + n_2 E^2$$

where $n_o$ is the unperturbed refractive index profile, $n_2$ is the Kerr coefficient and E is the modulus of the total field. Using a perturbation approach the change in the amplitudes of the light in each guide can be represented by a pair of nonlinear coupled equations as defined for a parallel fibre coupler by S. M. Oensen in IEEE OQE 18 1580-83(1982). We have found that these equations can be generalised for non identical waveguides to give:

$$-ida/dz = Q_{11}a + Q_2b + Q_{31}a^2a$$

$$-idb/dz = Q_{12}b + Q_2a + Q_{32}b^2a$$

$$-ida/dz = Q_{11}a + Q_2b + Q_{31}a^2a$$

$$-idb/dz = Q_{12}b + Q_2a + Q_{32}b^2b$$

where $Q_{11}$ and $Q_{12}$ are terms related to the propagation constants (which for a phase matched case will be equal), $Q_2$ is the linear coupling coefficient and must be the same in each equation in order to conserve energy, and $Q_{31}$ and $Q_{32}$ are overlap integral expressions relating to the nonlinear reaction of the mode of each waveguide with itself. a and b are the respective complex normalised amplitudes of the modes in the first and second waveguides.

Using the following relationships:

$$u = a^2 - b^2$$

$$v = i(a^*b - ab^*)$$

$$w = a^*b + ab^*$$

$$E = a^2 + b^2$$

in the above equations gives $$du/dz = 2Q_2v$$

$$dv/dz = TW - 2Q_2U + Ruw$$

$$dw/dz = -Tv - Ruv$$

where
T = P + SE
P = $Q_{11} - Q_{12}$
S = $(Q_{31} - Q_{32})/2$
R = $(Q_{31} + Q_{32})/2$ Using the substituted equations to get an equation in u which is the power distribution between the guides gives a second order differential equation $$d^2u/dz^2 + u^3R^2/z + u^23RT/-2 + u(T^2 + 4Q_2^2 - 2Q_2R) - ZQ_2T = 0$$

depends upon the launch conditions, and in the case where all power is initially in guide one:

$$= u_o/2Q_2(T + Ru_o/2)u_o = u(o)$$

For the nonlinear coaxial coupler when the modes of the rod and tube are phase matched P=0 and T=SE, and the differential equation can be normalised to give $$d^2y/dz^2 + f(y) = 0$$

in which
$$f(y) = y^3/2 + y^23h/2 + y(h^2 + c^2 - hy_o - y_o/2) - y_oh(-h + y_o/2)$$

and
h = S/R; c = $2Q_2/RE$ y = u/E; $y_o = U_o/E$
so that $(dy/dz)^2 + V(y) = 0$ where $V(y) = f(y)dy$.

Figure 3:
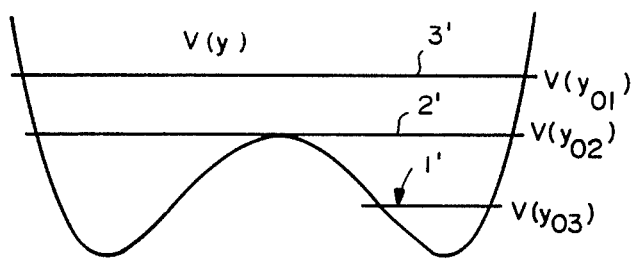
FIG. 3 shows the potential function for a symmetric overlap integral embodiment of the invention.

This expresses the variation of power division y subject to the potential function V(y) which depends upon the launch conditions. If all the power is launched into guide one and the coupler is symmetric in that $Q_{11} = Q_{12}$ and $Q_{31} = Q_{32}$ the potential function has a saddle point as shown in FIG. 3. Launching power of different levels 1', 2', 3' gives rise to the power division 1, 2, 3 similar to that shown in FIG. 1, that is a critical power phenomenon is exhibited and in this symmetrical case the power division is equal.

Figure 4:
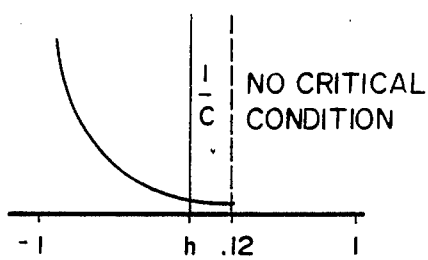
FIG. 4 shows the variation in critical power with normalised difference value of the $Q_3$ overlap integral.

To get a critical power phenomenon it is necessary for the potential function to have a saddle point and for $V(y) = V(y_o)$ at the saddle point. If the critical power condition is investigated in terms of $h = S/R = (Q_{31} - Q_{32})/(Q_{31} + Q_{32})$ which is a measure of the difference of the effect of the modes in the different guides upon themselves it is found that critical conditions to not always exist. FIG. 4 shows the variation in $1/c = RE/2Q_2 = E(Q_{31} + Q_{32})/4Q_2$ which is proportional to the input power with h, i.e. is a plot of critical power against $Q_3$ difference.

This shows that a critical power phenomenon is exhibited for negative values of h and for positive values up to 0.12. The symmetric case has h=o, so it can be seen from FIG. 4 that the critical power increases when the negative difference value increases, but is slightly reduced for small positive difference values.

If a nonlinear coaxial guide is made in an analgous way to a nonlinear parallel guide coupler using the same material, the $Q_{31}$ and $Q_{32}$ terms differ with $Q_{31}$ (of the rod) being five times larger than $Q_{32}$ (tube) giving a negative h value of −0.67 and very large critical power. For practical purposes it is desired to have the critical power at the lower end of the available range, and thus in the preferred embodiment of the invention the guides are designed so that the value of h lies within the range −0.12 to 0.12, or in other words the difference between the values of $Q_{31}$ and $Q_{32}$ is 12% or less than the total of $Q_{31} + Q_{32}$. The difference value $(Q_{31} - Q_{32})/(Q_{31} + Q_{32})$ is termed herein the normalised difference value.

The guide structure is preferably made to have the desired $Q_3$ values by selecting materials with suitably different Kerr coefficients. Alternatively, the geometric arrangement may be altered for example by increasing or reducing the diameter or thickness of the rod and tube in a coaxial arrangement.

When the coupler is non symmetrical, that is when $Q_{31}$ is different from $Q_{32}$ the potential function differs from that shown in FIG. 3 and although the combination may exhibit a critical power the distribution of power between the guides is asymmetric. This gives rise to a different family of couplers in which instead of seeking devices with a low critical power the devices are designed to provide a particular power distribution at the critical power. This differs from the nonlinear parallel fibre coupler which can provide different power distribution at non critical power levels but because of its symmetry of construction provides equal power distribution at the critical power.

Although the preferred embodiments of the invention utilise coaxially arranged waveguides, the principle of varying the critical power phenomenon may be applied to other arrangements that are not coaxial, or which do not have one waveguide disposed within the other.

I claim:

1. An optical coupler comprising first and second waveguides positioned in coupling proximity, the first waveguide comprising nonlinear refractive index material supporting first mode fields, and exhibiting a nonlinear reaction with itself having a particular overlap integral value; and the second waveguide comprising nonlinear refractive index material supporting second mode fields different from said first mode fields and exhibiting a nonlinear reaction with itself having a further particular overlap integral value, wherein the particular overlap integral value is in a predetermined ratio to the further particular overlap integral value providing predetermined critical power characteristics of the coupler.

2. An optical coupler comprising first and second waveguides positioned in coupling proximity, the first waveguide comprising nonlinear refractive index material supporting first mode fields, and exhibiting a nonlinear reaction with itself having a particular overlap integral value; and the second waveguide comprising nonlinear refractive index material supporting second mode fields different from said first mode fields and exhibiting a nonlinear reaction with itself having a further particular overlap integral value wherein the particular overlap integral value and the further particular overlap integral value have a normalized difference of 0.12.

3. An optical coupler according to claim 2 wherein the normalised difference value lies in the range $-0.12$ to $0.12$.

4. An optical coupler according to claim 1, 2 or 3 in which the values of the overlap integrals are selected by varying the nonlinear properties of the materials.

5. An optical coupler according to any preceding claim 1, 2 or 3 in which the values of the overlap integrals are selected by varying the geometry of the waveguides.

6. An optical coupler according to claim 4 in which the waveguides comprise nonlinear material with the same Kerr coefficient.

7. An optical coupler according to any preceding claim 1, 2 or 3 in which the waveguides are nested one within the other.

8. An optical coupler according to claim 7 in which the waveguides are coaxially disposed.

9. An optical coupler according to claim 7, arranged so that power is launched into the outer waveguide.

10. An optical coupler according to claim 7 in which the waveguides are both of tubular configuration.

11. An optical coupler comprising:

an inner cylindrical waveguide portion comprising non-linear refractive index material supporting first mode fields, said inner waveguide portion exhibiting a non-linear reaction with itself having a particular overlap integral value; and an outer tubular cylindrical waveguide portion, coaxial with and enclosing said inner waveguide portion, said outer waveguide portion comprising nonlinear refractive index material supporting second mode fields different from said first mode fields, said outer waveguide portion exhibiting a non-linear reaction with itself having a further particular overlap integral value, wherein said inner waveguide portion and outer waveguide portion are dimensioned and/or composed such that said inner waveguide portion overlap integral value and said outer waveguide portion overlap integral value have a predetermined ratio which provides optimal critical power coupling characteristics between said inner and outer waveguide portions.

12. A coupler as in claim 11 wherein said inner and outer waveguide portions are selected so that each of said inner and outer waveguide portion overlap integral valves has a maximum normalized difference of 0.12.

13. A coupler as in claim 11 wherein said first and second waveguide portions have the same Kerr coefficient.

14. An optical coupler comprising at least two waveguides positioned in coupling proximity, wherein the waveguides comprise nonlinear refractive index material that supports non-identical mode fields and wherein the waveguides are such that the value of the overlap integral of the nonlinear reaction of each waveguide with itself is in a predetermined ratio to that overlap integral of the other waveguide to provide predetermined critical power characteristics of the coupler, wherein the waveguides are nested one within the other.

15. An optical coupler comprising at least two waveguides positioned in coupling proximity, wherein the waveguides comprise nonlinear refractive index material that supports non-identical mode fields and in which the waveguides are such that the values of the overlap integrals of the nonlinear reaction of each waveguide integral value with itself have a maximum normalized difference of 0.12, wherein the waveguides are nested one within the other.

* * * * *